United States Patent
Malone et al.

(10) Patent No.: US 9,121,861 B2
(45) Date of Patent: Sep. 1, 2015

(54) PHOTONIC DOPPLER VELOCIMETRY LENS ARRAY PROBE INCORPORATING STEREO IMAGING

(71) Applicant: National Security Technologies, LLC, Las Vegas, NV (US)

(72) Inventors: Robert M. Malone, White Rock, NM (US); Morris I. Kaufman, Santa Fe, NM (US)

(73) Assignee: National Security Technologies, LLC, Las Vegas, NV (US)

( * ) Notice: Subject to any disclaimer, the term of this patent is extended or adjusted under 35 U.S.C. 154(b) by 0 days.

(21) Appl. No.: 14/214,234

(22) Filed: Mar. 14, 2014

(65) Prior Publication Data

US 2014/0347651 A1  Nov. 27, 2014

Related U.S. Application Data

(60) Provisional application No. 61/800,066, filed on Mar. 15, 2013.

(51) Int. Cl.
| | |
|---|---|
| *G01P 3/36* | (2006.01) |
| *G01S 17/58* | (2006.01) |
| *G02B 6/32* | (2006.01) |
| *G01S 17/89* | (2006.01) |
| *G01S 7/481* | (2006.01) |
| *G01S 7/491* | (2006.01) |

(52) U.S. Cl.
CPC ............. *G01P 3/36* (2013.01); *G01S 7/4812* (2013.01); *G01S 7/4813* (2013.01); *G01S 7/4818* (2013.01); *G01S 7/4917* (2013.01); *G01S 17/58* (2013.01); *G01S 17/89* (2013.01); *G02B 6/322* (2013.01)

(58) Field of Classification Search
CPC ......... G01P 5/26; G01P 13/045; G01P 3/366; A61B 3/1025; A61B 3/1233; A61B 5/01; A61B 5/027; A61B 5/7257; G01N 27/44721
See application file for complete search history.

(56) References Cited

U.S. PATENT DOCUMENTS

| | | | |
|---|---|---|---|
| 1,438,360 A | 12/1922 | Churchill | |
| 2,800,641 A | 7/1957 | Fagle et al. | |
| 3,866,055 A * | 2/1975 | Pike ............................ | 250/564 |

(Continued)

OTHER PUBLICATIONS

"Aspheric Lens" Wikipedia, the free encyclopedia, http://en.wikipedia.org/wiki/Asphere, Mar. 4, 2014, 6 pages.

(Continued)

*Primary Examiner* — Michael P Stafira
(74) *Attorney, Agent, or Firm* — Weide & Miller, Ltd.

(57) ABSTRACT

A probe including a multiple lens array is disclosed to measure velocity distribution of a moving surface along many lines of sight. Laser light, directed to the moving surface is reflected back from the surface and is Doppler shifted, collected into the array, and then directed to detection equipment through optic fibers. The received light is mixed with reference laser light and using photonic Doppler velocimetry, a continuous time record of the surface movement is obtained. An array of single-mode optical fibers provides an optic signal to the multiple lens array. Numerous fibers in a fiber array project numerous rays to establish many measurement points at numerous different locations. One or more lens groups may be replaced with imaging lenses so a stereo image of the moving surface can be recorded. Imaging a portion of the surface during initial travel can determine whether the surface is breaking up.

21 Claims, 7 Drawing Sheets

(56) References Cited

U.S. PATENT DOCUMENTS

| | | |
|---|---|---|
| 4,166,695 A | 9/1979 | Hill et al. |
| 4,346,991 A | 8/1982 | Gardner et al. |
| 4,743,110 A | 5/1988 | Arnaud et al. |
| 4,818,101 A * | 4/1989 | Soreide et al. ............... 356/28.5 |
| 4,887,310 A | 12/1989 | Meyzonnette et al. |
| 4,902,888 A | 2/1990 | Kondo |
| 4,929,080 A | 5/1990 | Burstyn |
| 5,013,928 A | 5/1991 | Ikeda et al. |
| 5,040,886 A | 8/1991 | Gunter |
| 5,071,239 A | 12/1991 | Hoffman et al. |
| 5,483,632 A | 1/1996 | Kuwamoto et al. |
| 5,587,785 A | 12/1996 | Kato et al. |
| 5,812,250 A | 9/1998 | Ishida et al. |
| 6,075,600 A | 6/2000 | Nagano et al. |
| 6,542,226 B1 | 4/2003 | Wernet |
| 6,762,827 B2 | 7/2004 | Aroussi et al. |
| 7,397,549 B2 | 7/2008 | Williams et al. |
| 8,120,757 B2 | 2/2012 | Dede et al. |
| 8,711,336 B1 | 4/2014 | Frogget et al. |
| 2003/0231829 A1 | 12/2003 | Meyers et al. |
| 2007/0156021 A1 | 7/2007 | Morse et al. |
| 2014/0118719 A1 | 5/2014 | Frogget et al. |

OTHER PUBLICATIONS

"Studies of the wind filtering effect of gravity waves observed at allahabad (25.45 N, 81.85 E) in India", G.K. Mukherjee, et al., Earth Planets Space, 62, 309-318, 2010, Mar. 4, 2010, 10 pages.

* cited by examiner

PHOTONIC DOPPLER VELOCIMETRY LENS ARRAY PROBE INCORPORATING STEREO IMAGING

2. PRIORITY CLAIM

This application claims priority to and the benefit of U.S. Provisional Patent Application No. 61/800,066 filed on Mar. 15, 2013.

1. STATEMENT REGARDING FEDERAL RIGHTS

This invention was made with government support under Contract No. DE-AC52-06NA25946 and was awarded by the U.S. Department of Energy, National Nuclear Security Administration. The government has certain rights in the invention.

3. FIELD OF THE INVENTION

This invention relates to photonic Doppler velocimetry and in particular to a method and apparatus for multipoint photonic Doppler velocimetry and stereo imaging using miniature optical lens elements.

4. RELATED ART

Photonic Doppler velocimetry (PDV) can be used to monitor movement of a curved surface that is moving along multiple points, such as during an experiment. The movement of the curved surface may occur due to an implosion, explosion, or any other force or factor that causes movement of the surface. Such movement often occurs during dynamic material experiments. These dynamic material experiments frequently involve complicated geometries and therefore large numbers of data points are a distinct advantage. Various solutions have been proposed to record the movement of the surface, but each of these various solutions suffer from various drawbacks.

One proposed prior art solution for measurement of the moving curved surface is the use of electrical shorting pins. In such a configuration, electrical shorting pins of various lengths were used to contact the moving service. An electrical pin provides a shorting signal between the surface and the pin tip when the tip of the pin comes into contact with the moving surface. Each electrical shorting pin gives a single timing point when the collapsing surface contracts the pin. Each length of a pin records one distance, so that many different lengths of pins are needed to follow the movement of an imploding surface. However, longer pins can interfere with the surface movement and interfere with the shorter pins. As a result, data may be corrupted by the interference. In addition, data is only collected by a pin when that pin contacts the moving surface. Movement prior to contact with the pin is not recorded. Moreover, a dense array of pins at many lengths is needed and this density may not be possible to achieve while also achieving desired data recordation.

Several different optical designs have been proposed to measure the behavior of the moving surface. One such proposed solution involved a ball-shaped housing with discrete fibers and discrete lenses pointed outward toward the surface of interest. This solution provided optic monitoring but it suffered from being size limited. As the number of optic fiber points is increased, this probe eventually comes to its limit in how small the entire group can be made, while still having reasonable optical fiber bending radii. The bend radius of the optic fibers limit size reductions in the probe and there is a limit to the number of fibers which may be packed in the probe.

Therefore, there is a need in the art for an accurate and cost effective light delivery and collection system for use as a collection probe in a PDV system. The velocity probe must be as small as possible to allow the collapsing surface movement to be recorded down to a small radius. There is a need to combine imaging capabilities with this velocity measuring probe.

SUMMARY

A new lens design with prism is disclosed for use in probe (which may be any size or miniaturized) to measure the velocity distribution of a moving surface along many lines of sight. An optic signal is directed to the surface of interest and the reflection from the surface, during movement of the surface, is processed to obtain information about the surface movement. The optic signal may be laser light. The optic signal is scattered back along each beam projected on the surface and is Doppler shifted by the moving surface before being collected by the probe and directed into the fiber. The received light is mixed with reference laser light in each optical fiber, in a technique called photonic Doppler velocimetry, providing a continuous time record. An array of single-mode optical fibers sends laser light through the lens system toward the surface. In one embodiment, the photonic Doppler velocimetry probe comprises a housing defining an interior space between a first end and a second end. One or more optic signal conductors is within the housing by entering through the second end and terminating within the interior space of the housing. The one or more optic signal conductors are configured to provide one or more optic signals to one or more lenses in the probe. A ferrule is located within the housing and it has one or more passages configured to receive and secure at least one of the one or more optic signal conductors to the ferrule.

A first lens is provided adjacent the ferrule to receive the optic signal. In this configuration the optic signal is traveling in a first direction. One or more additional lenses are adjacent the first lens and configured to direct the optic signal towards a prism. The prism is mounted at the first end of the probe and the prism is configured to receive the optic signal from the one or more additional lenses and reflect the optic signal outward in a second direction. The second direction is different than the first direction to thereby project the optic signal on a surface.

In one embodiment the one or more optic signal conductors are one or more optic fibers. In one configuration the one or more additional lenses comprise an aspheric lens and a singlet high-index spherical lens. The prism may be a pyramid prism and it is contemplated that the prism may have a first end, a second end, six side facets, and a centrally located aperture through the center of the prism that extends from the first end to the second end. In one embodiment, the first lens and the one or more additional lens are optically aligned to form a lens group, and a lens group is provided and optically aligned with each of the six side facets and the centrally located aperture through the center of the prism.

The first lens may be a doublet lens and the one or more additional lens may include at least one doublet lens. In one exemplary environment of use, the prism, the one or more additional lenses, the first lens and the one or more optic signal conductors are configured to receive a reflection of the optic signal from the moving surface and conduct the reflection back through the same optic signal conductor.

Also disclosed is a photonic Doppler velocimetry probe that includes a housing defining an interior space and one or more optic signal conductors within the interior space. The signal conductors have a terminating end configured to provide optic signals. Also part of the probe is one or more lenses which are located in the interior space of the housing (or at the end of but exterior to the housing). The lens is configured to receive the optic signals from the terminating end of the one or more optic signal conductors and present the optic signals to a refractive element configured to receive one or more optic signals from at least one of the one or more lenses. The one or more optic signals enter the refractive element in a first direction and then exit the refractive lens, after reflection off a facet of the prism, in a second direction, for projection onto a curved surface. The curved surface is the subject of photonic Doppler velocimetry measurement.

At least part of the housing may comprise a multi-layer stainless steel housing configured to hold and secure two or more lenses arranged into two or more lens groups. In one embodiment the one or more optic signal conductors are secured by a disk having one or more passages and the one or more optic signal conductors pass through the one or more passages. In this configuration the reflective element may be a prism. The prism may be a multi-faceted pyramid prism having two or more facets and a centrally located aperture.

It is contemplated that the one or more lenses may comprise at least one aspheric lens and at least one singlet high-index spherical lens. In use the refractive element, the one or more lenses and the one or more optic signal conductors may be configured to receive a reflection of the optic signal and conduct the reflection back through the one or more optic signal conductors.

Also disclosed is a method, during photonic Doppler velocimetry, for presenting an optic signal to a curved surface and receiving a reflection from the curved surface during movement of the curved surface. In one embodiment this method comprises establishing a distal end of a probe facing the curved surface, such that the distal end of the probe includes a prism having a facet. The facet is facing the curved surface. This method then generates an optic signal and presents the optic signal to an optic signal conductor. The optical signal passes through the conductor to one or more lenses. From the lenses, the optic signal is directed towards the prism in a first direction such that the prism reflects the path of the optic signal to a second direction to thereby project the optic signal onto a position on the curved surface. The method initiates movement of the curved surface and the prism receives a reflection of the optic signal at the prism from the curved surface. The reflection passes through the one or more lenses to the optic signal conductor.

In one embodiment, the prism comprises a six faceted prism with a centrally located aperture providing an opening in the center of the prism, and the one or more lenses comprise six lens groups such that six lens groups optically align with a facet of the prism and one lens group optically aligns with the aperture. This method may also process the optic signal and the reflection to perform photonic Doppler velocimetry to thereby monitor the movement of the curved surface. This method may further include passing the optic signal and the reflection through a circulator configured to perform as an optical directional coupler.

Because each lens group provides excellent image quality, the array of fibers using this lens group may be replaced by a coherent bundle. The images of the moving surface will reflect off a facet of the prism, pass through the lens group, and into the coherent bundle. The far end of this coherent bundle can be imaged onto a high speed camera that will provide two or more high speed snap shots (images) of the moving surface. Depending on what part of the moving surface needs to be imaged, the reflective facet of the prism may have a borehole cut through it. This will allow the image to be viewed along the optical axis of the lens group rather than reflected from the prism facet angle.

The housing design allows the optical components to be interchangeable. If the distance from the probe to the target surface has a design change, lens groups of different focal lengths will be substituted. Additionally, the fiber arrays and coherent bundles have focus adjustments built into the mechanical housing to optimize light collection at different working distances. During the probe assembly process, each probe will be optimized to have its fiber arrays and coherent bundles focused to specific distances from the end of the probe assembly.

Interchangeability of optical components is important in the case that the probe suffers damage. The probe housing is designed such that components can be swapped out or replaced. Extra fibers are inserted into the fiber arrays in the case that some of the fiber channels get broken.

Also disclosed is a method to replace one or more of the lens groups with a different focal length lens group that can provide images of the surface of interest. If two of the lens groups are replaced with imaging optics, a stereo image of the moving surface can be recorded. A high speed camera can record many images in time. These dynamic images may be collected only at the start of surface motion. The images may provide important details to the surface structure as it begins to move. In contrast, the PDV fiber channels follow this motion until the surface has collapsed into the probe structures.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Photonic Doppler velocimetry (PDV) with a novel light signal path is utilized to measure movement of a curved surface. PDV uses light scattered and reflected from a moving surface to continuously measure the movement of that surface. This method takes advantages of the Doppler principles.

As discussed above, drawbacks exist in the prior art with the probe that is used to present the light signal to the moving surface and collect the light signal from the moving surface. The probe structure and associated light path disclosed herein overcomes those drawbacks. In general, if the curved surface is collapsing on itself, the probe should be compact so the surface movement can be recorded over as much distance as possible before mechanical interferences compromise the data. In the embodiment disclosed herein there are seven different fiber-optic arrays which send light through miniature relay lenses. Six arrays reflect light off a six faceted pyramid prism. One array sends light through a hole in the prism, the hole being centrally located. Light from each fiber is retro-reflected off the moving surface back into itself. The lens design generates very small beam diameters that guarantee no cross talk between fiber channels.

Figure 1:
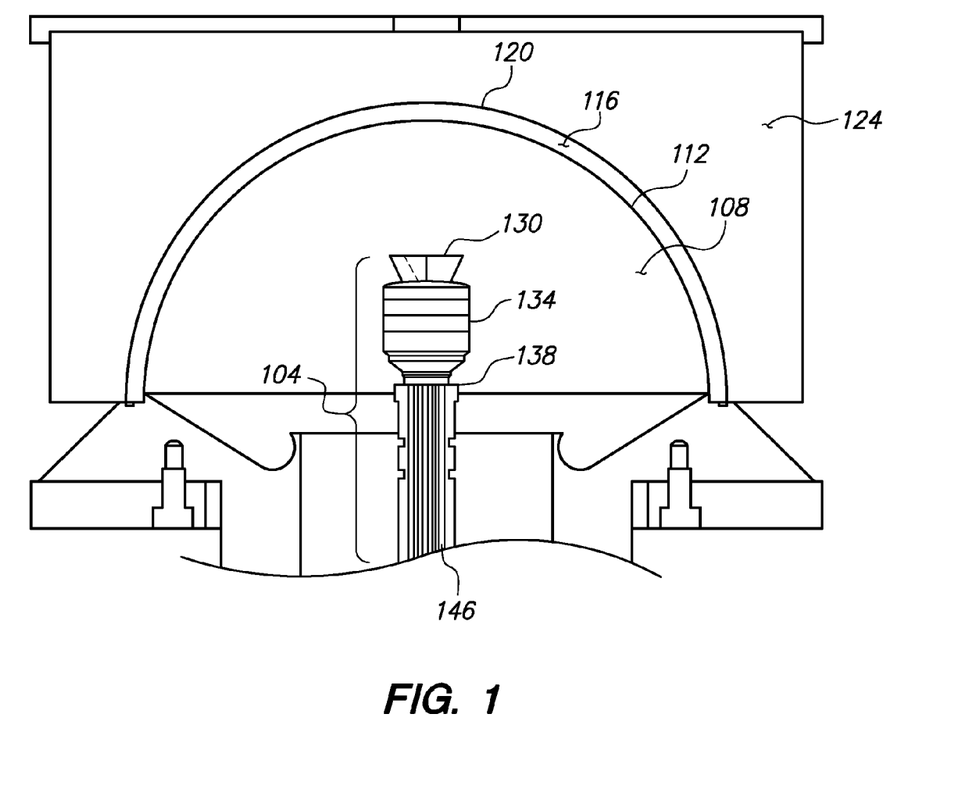
FIG. 1 illustrates a side view of an exemplary environment of use of the probe disclosed herein.

FIG. 1 illustrates a side view of an exemplary environment of use of the probe disclosed herein. This is but one possible environment of use and as such it is contemplated that other uses for the disclosed system may be arrived at by one of ordinary skill in the art.

As shown in FIG. 1, the probe assembly 104 is provided in the interior space 108 that is bounded by a curved interior surface 112 of a structure 116. The structure 116 is surrounded on an exterior surface 120 by a material 124. The material 124 may comprise any material that exerts a force on the surface 120 to thereby move the material 116 inward toward the probe assembly 104. In one embodiment, the material 124 comprises an explosive material that when detonated, implodes the interior surface 112 inward toward the probe assembly 104.

In other embodiments, it is contemplated that a material 124 other than explosives may be utilized such as, but not limited to heat, air pressure, liquid pressure, radiation, or any other type of force. The material 116 may comprise any type material or barrier. The interior area 108 may comprise any type material or void including but not limited to, a vacuum, air or other gas, or even other transparent material, such as gel or liquid.

It is also contemplated that the interior surface 112 may move outward, away from the probe assembly 104 instead of inward toward the probe assembly. In other embodiments, the surface may move in a non-uniform manner with a first portion of the surface 116 moving toward the probe assembly 104 and a second part of the surface moving away from the probe assembly.

On the exterior of the probe assembly 104 is a reflective prism 130 which rests in a support 134. Below the reflective prism 130 are one or more lens (not shown), discussed below in greater detail, which are contained in a support 134 and housing 138. In one embodiment, the reflective prism 130 has an aperture extending through the center of the prism. A reflective prism provides an ability to project and receive light over a very wide range of angles across the moving surface. One or more fiber optic cables are contained within a support tube 146.

In optics, a prism is a transparent optical element with flat, polished surfaces that refract light. In one embodiment, an aluminum coating is applied to one or more facets of the prism to reflect the light towards a specified location. At least two of the flat surfaces must have an angle between them. The exact angles between the surfaces depend on the application. The angles for this application as discussed below. The traditional geometrical shape is that of a triangular prism with a triangular base and rectangular sides. Some types of optical prism are not in fact in the shape of geometric prisms. Prisms can be made from any material that is transparent to the wavelengths for which they are designed. Typical materials include glass, plastic and fluorite. In this configuration, a glass prism is utilized because it is easy to polish its facets at desired angles. The prism may be used in reflective mode by having all its facets coated with aluminum after the polishing operation.

Figure 2:
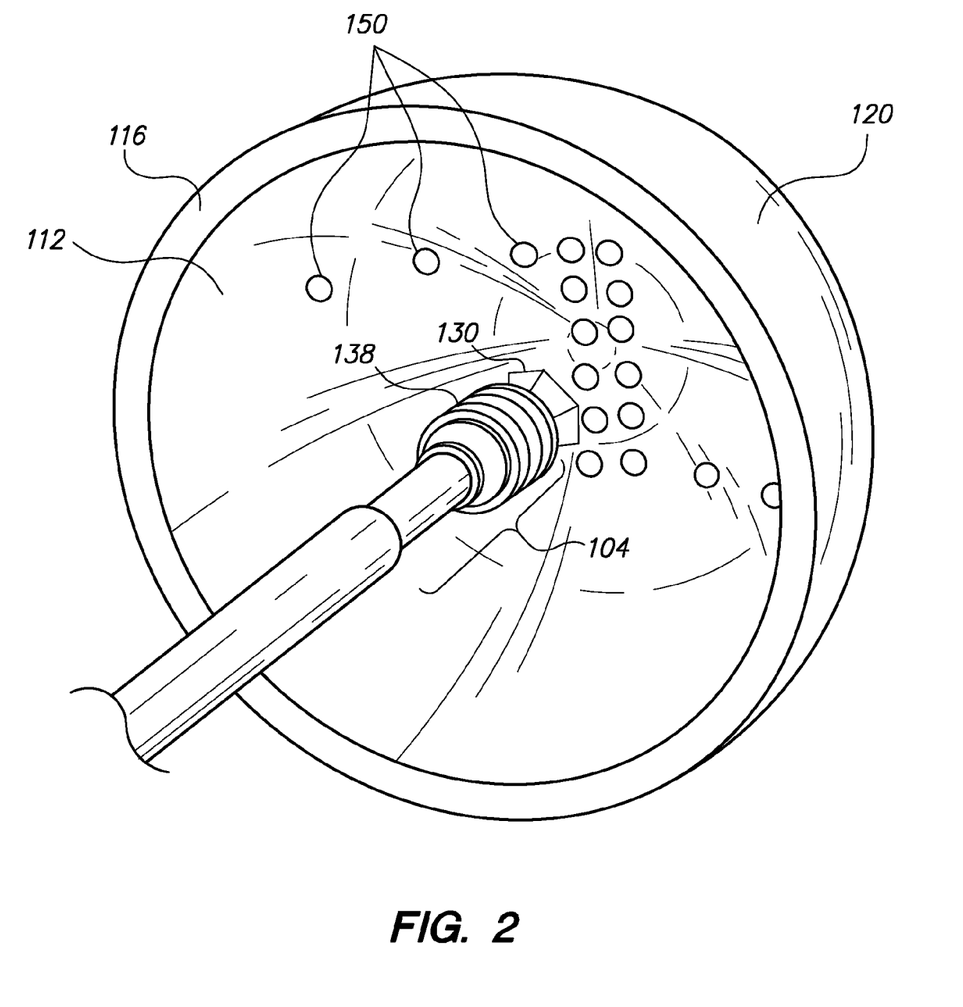
FIG. 2 illustrates a perspective view of the probe assembly and the interior surface.

FIG. 2 illustrates a perspective view of the probe assembly 104 and the interior surface 112. As compared to FIG. 1, similar elements are identified with identical reference numbers. As shown, the housing 138 of probe assembly 104 extends near or into the interior of the structure 116. The reflective prism 130 is at the distal end of the probe assembly 104 which faces the interior surface 112. The structure 116 has an interior surface 112 and an outer surface 120 which form a dome or spherical shape. As discussed below in greater detail, the reflective prism 130 projects one or more optic signals onto the interior of the inner surface 112. These points of projection are shown by reflection points 150. The diameters of reflection points 150 are drawn much larger than actual use for illustration only. Actual diameters range in size from 0.2 mm to a few millimeters depending on the application. These projections points 150 may be arranged towards any point on the interior surface subject to the monitoring preferences. As discussed below in greater detail, the location of the reflection points is determined by the location of the fiber optic cables and the lenses within the housing 138. This is but one configuration for the surface 112.

Figure 3:
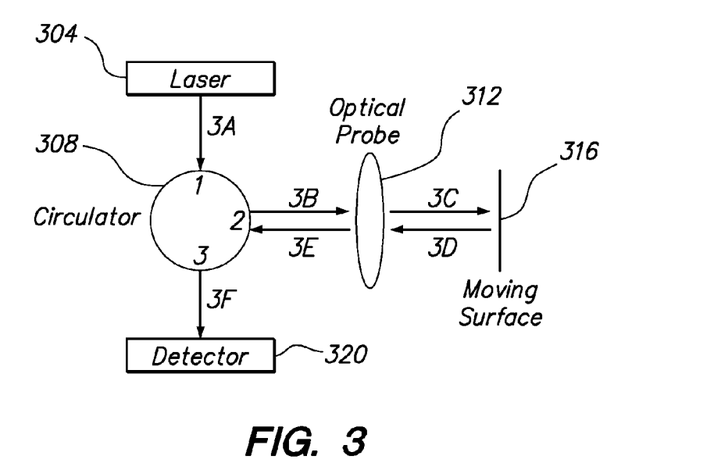
FIG. 3 is block diagram of an exemplary photonic Doppler velocimetry system.

FIG. 3 is block diagram of an exemplary photonic Doppler velocimetry system. As shown, a laser 304 generates a laser light output 3A which is provided to a circulator 308. The circulator outputs the laser light output 3B to an optical probe 312, such as the optic probe described herein, which in turn projects the laser light 3C to a moving surface 316. The reflection 3D is reflected back to the optical probe 312 and then as signal 3E to the circulator 308 where it is directed to the detector 320.

PDV is a fast-time-response Michelson interferometer made up of fiber-optic components. The beam splitter of the Michelson interferometer has been replaced with a fiber-optic circulator. In this example embodiment, the circulator performs as an optical directional coupler for the input light (3A) on fiber port 1. This light (3B) exits port 2 and is transported to an optical probe 312. The incident light (3C) is reflected from the moving surface (3D) and collected by the same optical probe. The light (3E) reenters the same fiber and reenters port 2, where it is directed inside the circulator out port 3. Back reflections from the probe itself (or through mixing with an external reference laser source) provide the unshifted (reference) light. Thus, the reference light travels back in the same fiber as the Doppler-shifted light (3D) to produce the mixed light (3E) that is presented to the detector (through fiber path 3F). It is possible to track and determine the distance moved by the surface illuminated using the PDV by counting fringes. In the example embodiment described herein, a velocity of 1 km/s corresponds to a recorded fringe frequency of ~1.29 GHz.

The velocity measuring technique known as photonic Doppler velocimetry (PDV) is a simple, relatively inexpensive method to measure surface velocities between a few mm/s up to 14 km/s, though the technology is developing and expected to measure higher velocities soon. In one embodiment, the PDV probe uses single-mode fibers to both transmit and receive interrogating light beams. The system described herein makes use of 1550 nm continuous wave (CW) fiber lasers, detectors, and digitizers developed for the telecommunications industry.

In one example embodiment, the minimum beam waist of the light beam aimed towards the moving surface is set at 35 mm in front of the curved surface. In one embodiment, the light emitted by the fibers is telecentric and effective focal length of the lens is 2.2 mm while the magnification is 30×. The spacing between the lenses were set to a minimum value while still preventing lenses from touching, which allowed the anti-reflective coating to minimize back reflections.

In use, the Doppler-shifted light from the moving surface is compared to un-shifted light to create fringes in a Michelson interferometer made up of fiber-optic components. Then, a fiber-optic circulator is used as the beam splitter of the interferometer. Reference (unshifted) light is provided through mixing with an external reference laser source or from back reflections in the probe itself. Surface velocities of between a few millimeters per second up to 14 km/s can be measured and it is expected that further development will allow operation at higher velocities. A PDV probe lens or bare fiber can both transmit and receive the laser light. In the embodiment, disclosed herein a 1550 nm telecommunications wavelength, continuous-wave (CW) fiber laser is used with matching fiber, fiber related devices, optic detectors, and signal digitizers.

Figure 4A:
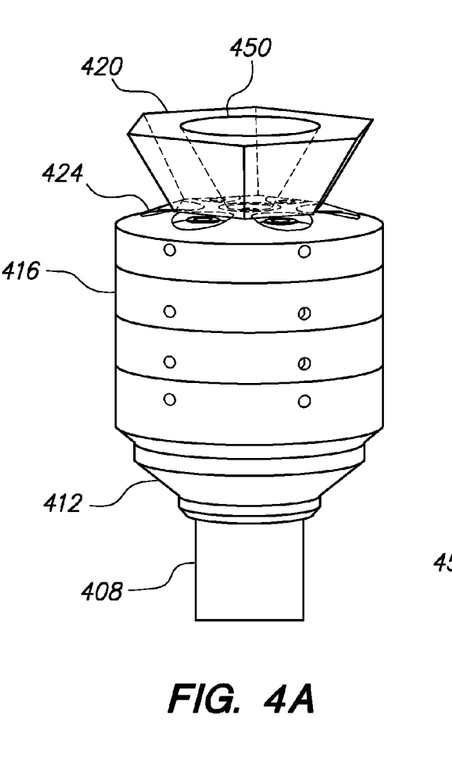
FIG. 4A illustrates a perspective view of an exemplary probe assembly.
Figure 4B:
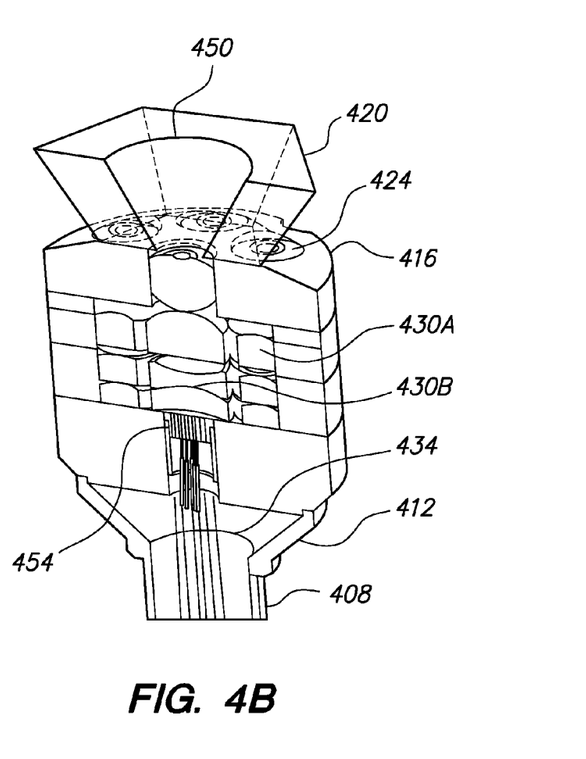
FIG. 4B illustrates a perspective cut-away view of exemplary probe assembly.

FIG. 4A illustrates a perspective view of an exemplary probe assembly. FIG. 4B illustrates a perspective cut-away view of exemplary probe assembly. Both figures are discussed in the following text. As shown, tube or other channel 408 has a hollow interior and is configured and sized to accept one or more fiber optic cables (not shown). An expanded bell 412 extends upward and outward from the channel 408 to mate with a housing 416. At the top of the housing 416 is the reflective pyramid prism 420. In this embodiment, we are using a six faceted pyramid prism.

As visible in the cut-away view of FIG. 4B, interior to the housing 416 are lens groups 430A, 430B, which are arranged to conduct an optic signal from one or more fiber optic cables 434 through housing aperture 424 at the top of the housing. Any number of lens groups 430 may be provided and it is contemplated that each lens group has at least one corresponding fiber optic cable 434 and aligns with at least one housing aperture 424. In this embodiment, located at the top center of the prism 420 is a prism aperture 450 which allows an optic signal from the centrally located lens group 430B to pass through the center of the pyramid prism 420. A fiber wafer 454 secures the fiber optic cables 434 near the lower portion of the lens groups 430 to maintain distance, fiber optic cable alignment, and otherwise secure the fiber optic cables.

In this example embodiment, the optical components are glued into the housing 416, which is constructed of stainless steel. In this embodiment, each type of lens groups 430 includes a doublet lens mounted into a precision ring. The lenses are preferably maintained dust free during assembly to minimize backscatter light losses. A brass rectangular box may serve as an alignment fixture (not shown). In this embodiment, the lens groups do not make optical contact with other elements to maintain ideal anti-reflective coatings performance. In this example configuration, and as shown below in greater detail, there are seven lens groups and seven corresponding fiber arrays, each of which contains one or more fiber optic cables. The cables 434 were rotated to prevent interferences. The prism aperture 450 was made to be cone shaped. The lenses may provide for magnification.

Figure 5:
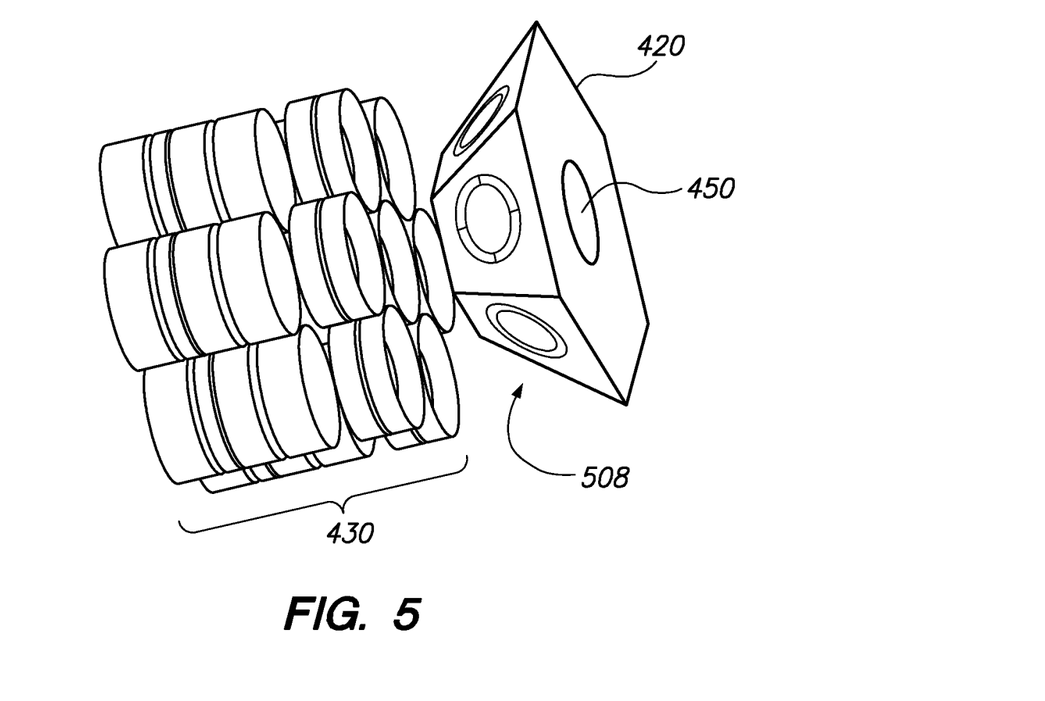
FIG. 5 illustrates a perspective view of lenses and prism assembly for an exemplary probe assembly.

FIG. 5 illustrates a perspective view of lenses and prism assembly for an exemplary probe assembly. In this view, the housing from FIGS. 4A and 4B is removed to reveal the lens groups 430 and the pyramid prism 420. At the center of the prism is the prism aperture 450.

Shown in FIG. 5 to aid in understanding the lens alignment is a reference image 508 which identifies where on the prism 420, the light exiting the lens will strike the prism. Thus, each lens group 430 may be configured to hit a different facet of the prism 420. The prism reflects the light it receives from the lens to direct the received light to the surface of interest, and thereafter receives the reflection. This is better shown in FIG. 6.

Figure 6:
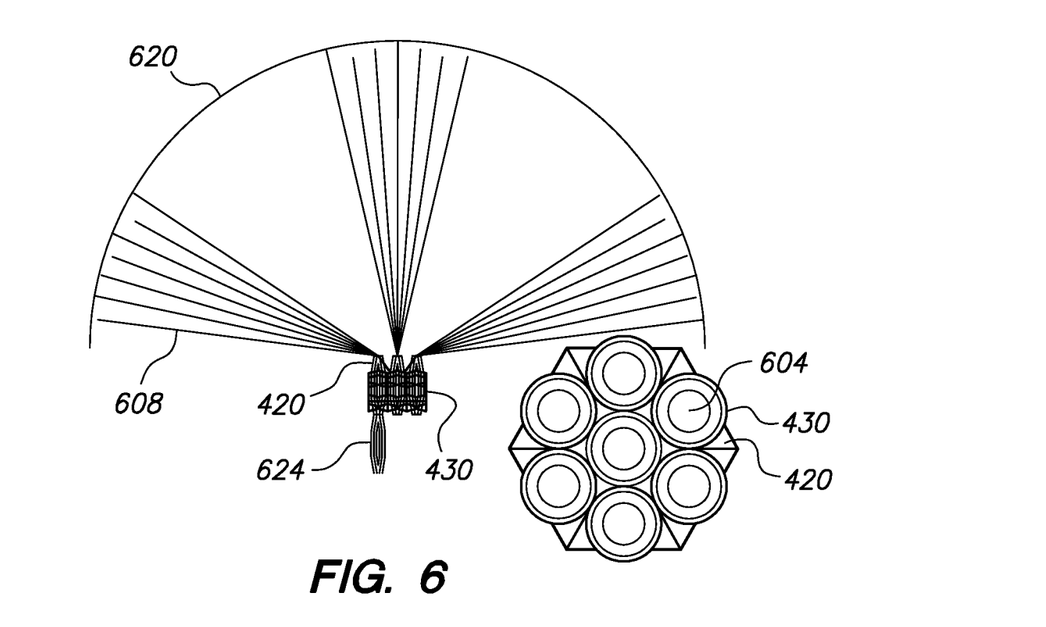
FIG. 6 illustrates a bottom plan view of the lenses and prism assembly with corresponding coverage on a curved surface.

FIG. 6 illustrates a bottom plan view of the lenses and prism assembly with corresponding coverage on a curved surface. As shown, the bottom surface 604 of the lens groups 430 are shown in relation to the prism 420. In this embodiment, there is a 7 lens group formed into a six group ring with a center lens group. In this embodiment, each lens group in the outer ring is aligned with a prism facet as shown. In other embodiment, other arrangements are contemplated such that any number or arrangement of lens groups may be provided and any number of prisms and facets may be provided. Any of the lens groups 430 can have different focal lengths which would change their area coverage zone on the surface of interest 620.

Also shown in FIG. 6 is exemplary light ray projection 608 from the prism 420 to a surface of interest 620. A fiber array 624 conducts the light signal from the laser/circulator to the lens groups and reflects from the surface to the optic signal detector.

In one embodiment, the fiber array is made up of single-mode fibers in a ribbon construction. Six ribbons are secured inside of an MT connector that provides 72 fibers for each of the seven lens sets for a total of 504 fibers. In other embodiments other fiber arrangements are possible. At the other end, each of the fibers may use an FC-APC connector. Not all of these fibers must be used, such as if there is a limited number of recording channels available.

In this embodiment the prism 420 comprises a pyramid prism that has a 55° facet angle. Standard prism fabrication technology may be used for construction. In this embodiment, the facets of the prism were coated with enhanced aluminum for maximum reflectivity at 1550 nm. In FIG. 5, the stop position is located at the prism facet. In this embodiment, the prism aperture 450 is a 5-mm cylindrical hole that aligns and is used for the center lens group.

As shown in FIG. 6, for the particular configuration shown there are zones of the surface where no measurements would be collected. If there is symmetry in the movement of the surface, then other zones could be viewed by changing the prism facet angles to provide missing angle coverage. No more net surface area would be covered, but more discrete angles would be covered. Assuming symmetry of the moving surface can be maintained, a much better data set can be obtained with this type of custom prism. For example, a 45° angled mirror facet allows light beams to measure below a horizontal plane. So, a mixture of different facet angles allows for maximum angle coverage of the surface of interest 620.

Figure 7A:
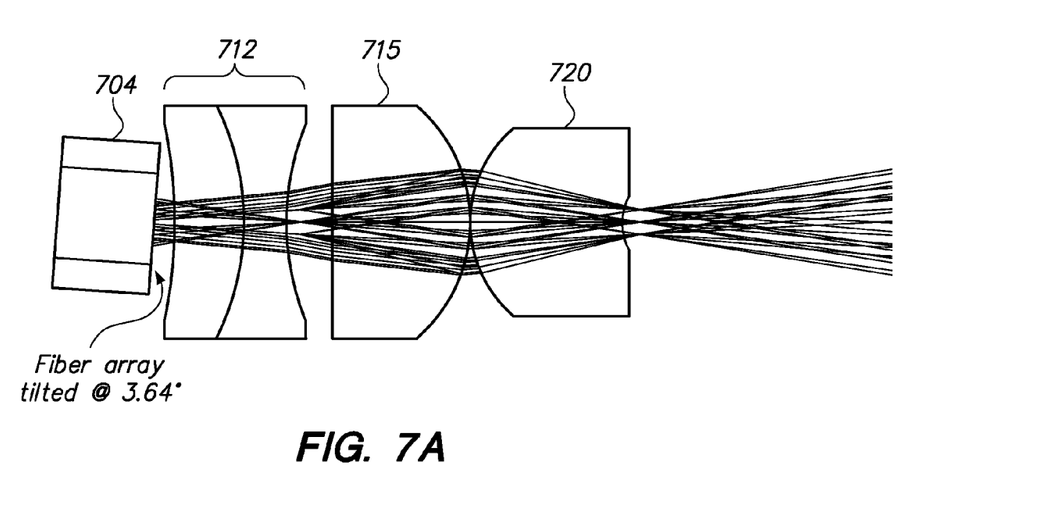
FIG. 7A illustrates one exemplary lens arrangement with resulting ray traces through the lenses.

FIG. 7A illustrates one exemplary lens arrangement with resulting ray traces through the lenses. This lens arrangement and ray trace is for the center lens group which passes and receives light through the center aperture of the prism. Other configurations may be used for the lens groups which reflect light rays off the facets of the prism.

The fiber bundle 704 (shown as fiber wafer 454 in FIG. 4) contains the optic fibers (not shown) such that the optic fibers carry the optic signals which are projected outward through the lenses. In this configuration the lenses include three lenses: a first doublet group 712, the second lens element 715, and the third lens element 720. Although other lens configurations and arrangements are possible, these custom lenses, provided good performance with small spot sizes. The spot size is the size of the spot projected on to the surface. The second lens element 715 is a molded aspheric lens which has a single aspheric surface. In other embodiments the second lens element 715 could be a doublet. In this configuration the third lens element 720 is a singlet high-index spherical lens, but in other embodiment the third lens element could be a doublet lens.

Figure 7B:
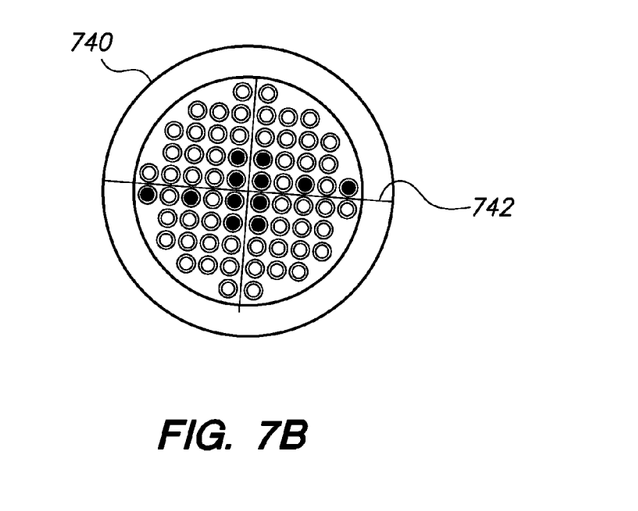
FIG. 7B illustrates one exemplary ferrule for fiber optic cable openings.

It is also noted that minimizing probe back reflections is preferred when performing the PDV measurement. A flat polished array with an antireflective coating applied to its surface will reflect −30 dB light. To eliminate this back reflection, the array may be tilted 8°. While this reduces the reflection to less than −70 dB, this arrangement steers the beam by 3.64°. Therefore, the array may be tilted 11.64°. The tilt axis 742 is illustrated in FIG. 7B. FIG. 7B illustrates one exemplary ferrule for fiber optic cable openings. Tilting the array will also tilt the best focus locations of the fibers to allow the fiber light to enter telecentrically into the lens group. It is also contemplated that the fiber array may be close to the first lens doublet group 712. Individual single-mode fibers may be cleaved at an 8° angle. For the final design, the cleaved fibers were placed into a Delrin plastic wafer 740 with precision drilled holes. As a result, the fiber array may be at a 3.6° tilt as shown in FIG. 7A. As a result, there is much less tilt to the image plane. All fibers in the array have an 8° tilts lined up and clocked correctly with the 3.6° wafer housing tilt.

In addition, too much magnification of the lens group will cause wildly varying spot diameters along the beam trajectories. As a result, magnification can be limited to avoid such variance. In one or more embodiments index-matching gel or epoxy may be used.

As shown in FIG. 7A, the center lens group passes its light through a hole in the pyramid prism. The 4 mm diameter lens needed a special bevel to prevent clipping the light when it reflected off the prism facet (not shown) for the other six lens groups. Because of the 11.64° tilt, the arrays were cropped elliptically to prevent lens interferences. Minimum beam waist has been reduced from 1.76 mm to 0.69 mm diameter. Because of the higher magnification, the beam waist was moved off the surface of the prism facet. This compromise caused the zero crossing volume to increase.

In order to achieve a variety of surface coverage, each of the fiber arrays can be clocked differently. The array also has some focus adjustment that can position the minimum beam waist of the central fiber at a specific distance. Each of the seven arrays of this embodiment can have a different population of optical fibers. Because of the array tilt, larger field points exist in the YZ direction compared to the XZ direction. Numerous different fiber array tilts are possible and the tilting results in slight interference when positioning the array next to the first lens. Because of the tilt on one axis, the pattern of "useful" fibers is slightly elliptical in shape for the field point. It is also contemplated that each fiber array can be rotated. Each array is filled with a different arrangement of fibers.

Figure 8A:
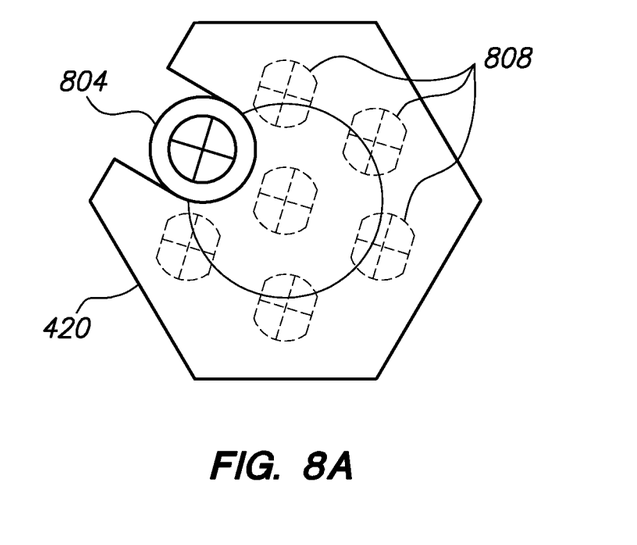
FIG. 8A illustrates a top plan view of an embodiment configured for surface imaging.

In an alternative embodiment, the photonic velocimetry system is configured to image the surface of interest. By creating an image, which may include stereo imaging to provide depth or other three dimensional views, the behavior of the surface during movement can be better understood. FIG. 8A illustrates a top plan view of an embodiment configured for surface imaging. In FIG. 8A, the pyramid prism 420 is shown, but in this configuration a portion of one of the prism facets is cut away to expose one or more imaging lenses 804. In this embodiment, the stereo image can only be recorded up to 10 mm of travel. After 10 mm of surface travel, the image will quickly get blurred because of the limited depth of focus for the imaging lenses 836. If longer depth of focus is desired, then the stop aperture of the imaging lenses 836 has to be reduced and there may not be enough light collected to adequately reconstruct the stereo image. The fiber arrays 808 that make use of other facets of the prism are shown for reference.

Figure 8B:
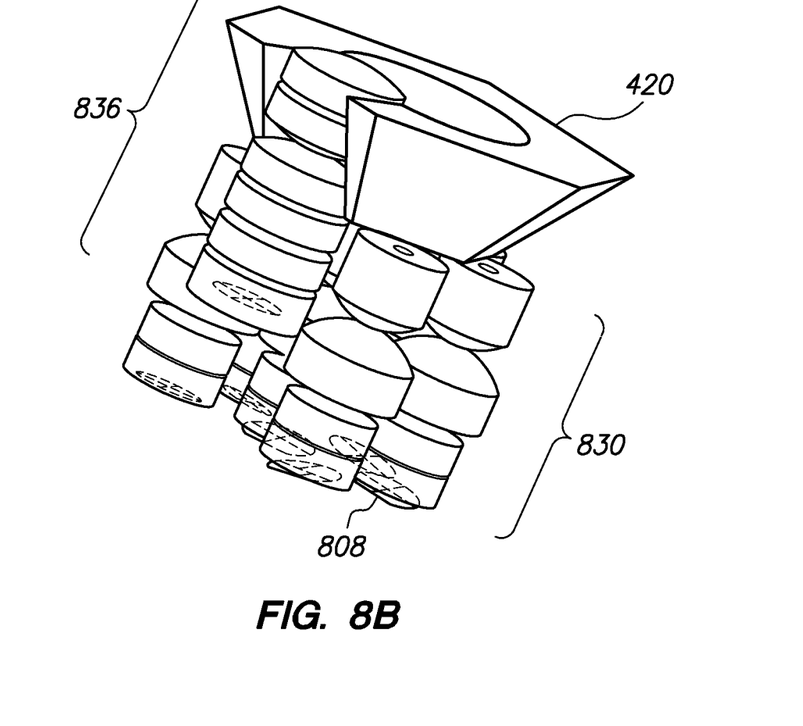
FIG. 8B illustrates a perspective view of an embodiment configured for surface imaging.

FIG. 8B illustrates a perspective view of an embodiment configured for surface imaging. As shown, the lens groups 830 as described above are positioned in relation to the pyramid prism 420. To provide imaging, an imaging lens group 836 has replaced one of the lens groups 830. Imaging lens group 836 is established closer to the top edge of the prism 420 than the other lens groups 830 which project light upward towards the prism 420 facets. Although the image lens group could project light to and receive light from the prism 420, in this configuration of FIGS. 8A, 8B the image lens group 836 bypasses the prism 420 to project light to and receive light from the surface directly. It is contemplated that the coherent bundle, which replaced the fiber array, would likewise be moved upward.

This configuration is realized based on the value of the PDV data being enhanced if dynamic surface imaging can simultaneously be recorded. Providing pictures as the target surface moves provides confidence that the PDV fiber channels are recording a surface that is intact. This embodiment provides a framing camera technique that will collect nine (or any other number depending on lens and fiber combinations) high-speed images. Static images will also verify that fiber spots within its imaging area are properly aligned and have not moved since calibration. A special hole is provided in the pyramid prism 420 to accommodate imaging as shown in FIGS. 8A, 8B. In this embodiment, imaging group is a coherent bundle and can be circular because it is not tilted. As shown, the imaging lenses have been moved up higher into the prism to prevent clipping of the imaging light. This allows more bending room for the coherent bundle in the region of the photonic Doppler velocimetry fibers. In this configuration, the imaging lens group 836 comprises a different set of doublet lenses for the imaging capability as shown, but in other embodiments, other lens arrangements may be used to perform imaging. The imaging may be stereo imaging if another prism facet is cut out and a second lens group 836 replaces one of the other lens groups 830.

Figure 9:
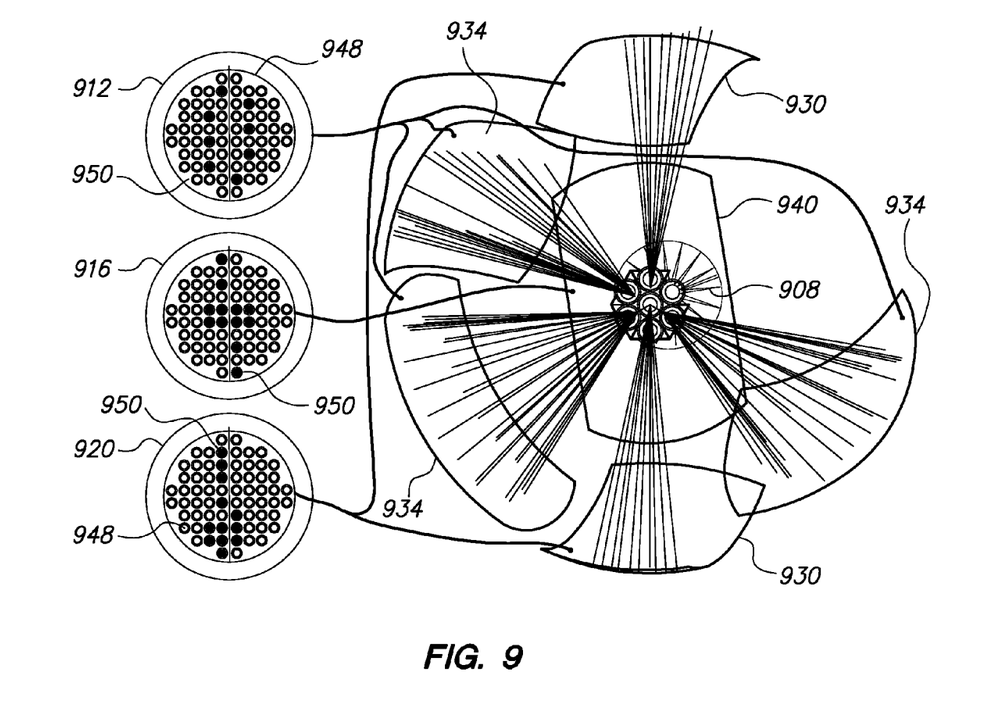
FIG. 9 illustrates exemplary ferrules and resulting coverage areas for the lens and prism configuration shown in FIG. 7A, FIG. 7B, FIG. 8A and FIG. 8B.

FIG. 9 illustrates exemplary ferrules and resulting coverage areas for the lens and prism configuration shown in FIG. 8A and FIG. 8B. In FIG. 9, three example fiber layouts 912, 916, 920 are shown. Fiber layout (wafer) 912 utilizes eight fibers in the fiber bundle, while fiber layouts 916, 920 both utilize twelve fibers.

Coverage zones 934 correspond to fiber layout 912 and thus illustrate the coverage on the surface being monitored for the fiber layout 912. Coverage zone 940 corresponds to fiber layout 916 and thus illustrates the coverage on the surface being monitored for the fiber layout 916. Coverage zones 930 corresponded to fiber layout 920 and thus illustrate the coverage on the surface being monitored for the fiber layout 920. The circles in the wafer indicate opening or apertures 948 through which fiber optic cables could pass. The darker circles indicate the fibers 950. Not all holes in the wafer layout 920 are occupied by fibers 950. In this configuration, the imaging lens group 908 comprises a different set of doublet lenses for the imaging capability as shown, but in other embodiments, other lens arrangements may be used to perform imaging. The imaging may be stereo imaging.

In this particular embodiment, the imaging lens group 836 has smaller magnification than the other lens groups 830, as seen by the circular zone 908. In this embodiment, the resolution of the imaging is better than 50 lp/mm, as measured at the coherent bundle. In other embodiments, higher resolutions are available using different lens group configurations. The fiber array using the cone hole of the prism (coverage zone 940) is elliptical in profile. With proper rotation, none of its fiber light is clipped by the lenses inserted into the imaging hole of the prism. The surface to be viewed may optionally be illuminated with high-intensity strobe light, introduced external to the probe. The strobe light may come through fiber-optic bundles.

This method of operation thus measures the velocities at many points under an imploding surface. This optical probe provides a continuous time record of the imploding surface. Discrete optical fibers from the probe produce many lines of sight onto this moving surface. It is important to sample as many lines of sight as possible and to produce the smallest possible spot sizes measured along the trajectories. Lines of sight are emitted from a small volume (a zero crossing zone). It is desirable to measure higher densities of spots over some regions of interest and to be able to measure below the horizon. The probe is efficient to measure the low reflectivity of the moving surface.

In one embodiment, intensity measurements are conducted with a laser/detector system using a fiber-optic cross coupler. For example, light from a 1550 nm CW laser feeds light into the cross coupler. This light is imaged onto a diffuse surface mounted to a computer controlled translation stage. Reflected light from the diffuser is collected by the lens probe, fed through the cross coupler, and onto a detector. A software program may be configured to plot intensity versus travel of the diffuse reflector. For a selected number of fibers, the optical backscatter reflectometer OBR or other type of optical time domain reflectometer will also measure distances from the array to the surface. This measurement will map the global positioning of this lens probe's fibers relative to the target surface. In one embodiment 10 μm of resolution is achieved. One purpose of the static OBR measurement is to precisely map out the radius of curvature of the surface of interest 112. Another measurement station may be configured to photograph the light from a collection of fibers hitting an image converter placed on top of a transparent grid pattern.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A photonic Doppler velocimetry probe comprising
   a housing defining an interior space between a first end and a second end;
   one or more optic signal conductors entering the housing through the second end and terminating within the interior space of the housing, the one or more optic signal conductors configured to provide one or more optic signals to one or more lenses in the probe;
   a ferrule, located within the housing, having one or more passages configured to receive and secure at least one of the one or more optic signal conductors to the ferrule;
   an first lens adjacent the ferrule to receive the optic signal, the optic signal traveling in a first direction;
   one or more additional lenses adjacent the first lens configured to direct the optic signal;
   a prism, mounted at the first end of the probe, the prism configured to receive the optic signal from the one or more additional lenses and reflect the optic signal outward in a second direction, the second direction being different than the first direction.

2. The probe of claim 1 wherein the one or more optic signal conductors are one or more optic fibers.

3. The probe of claim 2 wherein the one or more additional lenses comprises an aspheric lens and a singlet high-index spherical lens.

4. The probe of claim 3 wherein the prism is a pyramid prism.

5. The probe of claim 1 wherein the prism has a first end, a second end, six side facets, and a centrally located aperture through the center of the prism that extends from the first end to the second end.

6. The probe of claim 5 wherein the first lens and the one or more additional lens are optically aligned to form a lens group, and a lens group is provided and optically aligned with each of the six side facets of the prism and the centrally located aperture through the center of the prism.

7. The probe of claim 1 wherein the first lens is a doublet lens and the one or more additional lens comprise at least one doublet lens.

8. The probe of claim 1 wherein the prism, the one or more additional lenses, the first lens and the one or more optic signal conductors are configured to receive a reflection of the optic signal and conduct the reflection back through the optic signal conductor.

9. A photonic Doppler velocimetry probe comprising
   a housing defining an interior space;
   one or more optic signal conductors within the interior space and having a terminating end configured to provide optic signals;
   one or more lenses, located in the interior space of the housing, configured to receive the optic signals from the terminating end of the one or more optic signal conductors;
   a refractive element configured to receive one or more optic signals from at least one of the one or more lenses, the one or more optic signals entering the refractive element in a first direction and exiting the refractive lens, after reflection off a prism facet, in a second direction, for projection onto a curved surface, the curved surface being the subject of photonic Doppler velocimetry measurement.

10. The probe of claim 9 wherein the one or more optic signal conductors comprise one or more optic fibers.

11. The probe of claim 10 wherein the housing comprises a multi-layer stainless steel housing configured hold and secure two or more lenses arranged into two more lens groups.

12. The probe of claim 11 wherein the one or more optic signal conductors are secured by a disk having one or more passages, and the one or more optic signal conductors pass through the one or more passages.

13. The probe of claim 9 wherein the reflective element comprises a prism.

14. The probe of claim 13 wherein the prism is a multi-faceted pyramid prism having two or more facets and a centrally located aperture.

15. The probe of claim 9 wherein the one or more lenses comprises at least one aspheric lens and at least one singlet high-index spherical lens.

16. The probe of claim 9 wherein the refractive element, the one or more lenses and the one or more one or more optic signal conductors are configured to receive a reflection of the optic signal and conduct the reflection back through the one or more optic signal conductors.

17. A method, during photonic Doppler velocimetry, for presenting an optic signal to a curved surface and receiving a reflection from the curved surface during movement of the curved surface comprising:
   establishing a distal end of a probe facing the curved surface, the distal end of the probe including a prism having a facet, the facet facing the curved surface;
   generating an optic signal;
   presenting the optic signal to an optic signal conductor;
   passing the optic signal through the optic signal conductor to one or more lenses;
   from the lenses, directing the optic signal into the prism in a first direction, the prism reflecting the path of the optic signal to a second direction to thereby project the optic signal onto a position on the curved surface;
   initiating movement of the curved surface;
   receiving a reflection of the optic signal at the prism, the reflection being reflected from the curved surface;
   passing the reflection through the one or more lenses to the optic signal conductor.

18. The method of claim 17 wherein the prism comprises a six faceted prism with a centrally located aperture providing an opening in the center of the prism and the one or more lenses comprise six lens groups such that six lens groups optically align with a facet of the prism and one lens group optically aligns with the aperture.

19. The method of claim 17 further comprising processing the optic signal and the reflection to perform photonic Doppler velocimetry to thereby monitor the movement of the curved surface.

20. The method of claim 17 further comprising passing the optic signal and the reflection through a circulator configured to perform as an optical directional coupler.

21. A method, during photonic Doppler velocimetry, for imaging a curved surface during movement of the curved surface, the method comprising:
   establishing a distal end of a probe facing the curved surface, the distal end of the probe including image optics facing the curved surface, the image optics configured to generate a stereo image of the curved surface;
   generating an optic signal;
   presenting the optic signal to the image optics;
   directing the optic signal through the image optics onto the surface to thereby project the optic signal onto a position on the curved surface;
   initiating movement of the curved surface;
   receiving an image reflection from the curved surface through the image optics and recording the image of the surface reflection with a camera.

* * * * *